3,499,045
PURIFICATION OF 2,4,5-TRICHLOROPHENOL
Thomas F. Cleary, Summit, N.J., assignor to Centerchem, Inc., New York, N.Y., a corporation of New York
No Drawing. Filed Oct. 20, 1966, Ser. No. 587,991
Int. Cl. C07c 39/32
U.S. Cl. 260—623                                  1 Claim

ABSTRACT OF THE DISCLOSURE

This invention is directed to a method for purifying crude 2,4,5-trichlorophenol by treating it with an aqueous alkali hydroxide to form an alkali salt of the crude product, adding an additional quantity of the alkali hydroxide, then crystallizing and separating the alkali salt of 2,4,5-trichlorophenol and recovering essentially pure 2,4,5-trichlorophenol from the separated alkali salt by treating the salt with an acid.

---

This invention relates to new and useful improvements in the production of essentially pure 2,4,5-trichlorophenol and particularly seeks to provide a novel method for purifying crude 2,4,5-trichlorophenol.

2,4,5-trichlorophenol is produced conventionally by the reaction of 1,2,4,5-tetrachlorobenzene with methyl alcoholic or aqueous methyl alcoholic sodium hydroxide at an elevated temperature and pressure. The resulting crude product when isolated contains only about 88–92% of the desired 2,4,5-trichlorophenol and is inevitably accompanied by at least three impurities consisting of the methyl ether of 2,4,5-trichlorophenol, the 2,4-5-trichlorophenyl ether of 2,4,5-trichlorophenol, and 2,4-dichlorophenol. The latter impurity results from trichlorobenzene which is present as an impurity in the tetrachlorobenzene. There are also traces of several other impurities which occur as by-products or as substances present in the starting reactants.

Heretofore a degree of purification has been effected in a costly manner by a single distillation which raises the 2,4,5-trichlorophenol content to about 94–96% while a second distillation will raise it only slightly more to about 97–98% and even this degree of purity is inadequate for certain end uses. Furthermore, the yield of purified 2,4,5-trichlorophenol obtained by distillation is not very high because a very careful fractionation must be carried out.

However, in accordance with this invention it is possible to simply and inexpensively separate essentially pure 2,4,5-trichlorophenol from the crude reaction mixture.

Therefore, an object of this invention is to provide a novel process for purifying 2,4,5-trichlorophenol.

Another object of this invention is to provide a process of the character stated in which at least 95% of the 2,4,5-trichlorophenol present in the crude product is recovered in at least a 99.5% pure state and has a melting point of 65 to 67° C.

Another object of this invention is to provide a process of the character stated that is based upon the separation of 2,4,5-trichlorophenol from an aqueous medium as its sodium or potassium salt, in the presence of an excess of an alkali hydroxide, followed by liberation of free 2,4,5-trichlorophenol by acidification of the salt.

The following examples are illustrative of the invention:

EXAMPLE I 200 grams of a commercial grade of 2,4,5-trichlorophenol containing 94% of the 2,4,5-isomer was dissolved in 600 grams of 10% sodium hydroxide solution, and this solution was heated to 60° C. Any insoluble matter which was apparent in this solution was filtered off and there was then added 600 grams of 50% sodium hydroxide solution, and the mixture was stirred while external cooling was applied. Over a period of 3 hours the mixture was cooled to 15° C., whereupon a heavy crystal mass of the sodium salt of 2,4,5-trichlorophenol had formed. The crystals were filtered off and washed with a small quantity of cold 30% sodium hydroxide solution. The pure white crystals were dissolved in 2 liters of water, and with stirring and cooling, the solution was adjusted to a pH of 3.0 with dilute hydrochloric acid. The 2,4,5-trichlorophenol which precipitated, was filtered off, washed with water, and dried. The yield of purified 2,4,5-trichlorophenol, having an assay of 99.6% and a melting point of 65.5 C. was 179 grams, representing a recovery of 95% of the 2,4,5-trichlorophenol which was present in the starting crude material.

EXAMPLE II 430 grams of commercial grade 1,2,4,5-tetrachlorobenzene was dissolved in 1,000 cc. of methyl alcohol, and 400 grams of 50% sodium hydroxide solution was added. This mixture was heated in an autoclave at 160° for 6 hours. The reaction mixture was then cooled to 30° C., and 500 cc. of water was added. The methyl alcohol was then distilled off and the residue was subjected to steam distillation until no organic matter was evident in the steam distillate. To the residue was then added 1,200 grams of 50% sodium hydroxide solution and the entire mixture was heated to 60° C. An additional 500 cc. of water was added, and the mixture was cooled over a period of 6 hours to 15° C., whereupon a heavy crystal mass of the sodium salt of 2,4,5-trichlorophenol formed. The crystals were removed by filtration, and washed with a small quantity of cold 30% sodium hydroxide solution. The crystals were dissolved in 1 liter of water and the solution was warmed to 70° C., and acidified to pH 3 with dilute hydrochloric acid. The 2,4,5-trichlorophenol separated from the warm mixture as an oil, and was removed from the water layer. The product had a setting point of 65° C., and an assay of 99.5% 2,4,5-trichlorophenol. The yield was 320 grams which represents a yield of 80.8% of the theoretical amount of pure 2,4,5-trichlorophenol from 1,2,4,5-tetrachlorobenzene.

EXAMPLE III 200 grams of a crude technical grade of 2,4,5-trichlorophenol, having an assay of 92.5% of the 2,4,5-isomer is dissolved in 600 cc. of 10% potassium hydroxide solution. The solution is heated to 60° C., and 800 grams of 50% potassium hydroxide solution is added. The mixture is cooled with stirring over a period of 8 hours to 12° C. The formed crystals of the potassium salt of 2,4,5-trichlorophenol are filtered off and washed with a small quantity of cold 25% potassium hydroxide solution. The crystals are dissolved in 1 liter of water, and 300 cc. of chloroform is added. With stirring, the mixture is acidified to a pH of 2.0 with dilute sulfuric acid. The chloroform solution is separated and clarified by filtration. The chloroform is distilled off, leaving a residue of 177 grams of 2,4,5-trichlorophenol having an assay of 99.7%, and a melting point of 66.5° C. This represents a recovery of 95% of the 2,4,5-trichlorophenol which was present in the crude starting material.

In the foregoing examples the excess alkali hydroxide should be present in an amount ranging from 1 to 3 times the weight of the 2,4,5-trichlorophenol.

Although only hydrochloric and sulfuric acids have been disclosed as the acidifying agents, it will be appreciated that many other acids could be used for this purpose as long as they are capable of reducing the pH to 4.5 or lower.

The phrase "essentially pure" is intended to indicate a purity of at least 99.5%.

I claim:

1. In a process for obtaining essentially pure 2,4,5-trichlorophenol from a crude product, wherein the crude product is obtained from the hydrolysis of 1,2,4,5-tetrachlorobenzene, the steps of forming an alkali salt of 2,4,5-trichlorophenol by treating said crude product with an aqueous alkali hydroxide selected from the group consisting of sodium and potassium hydroxides in which an excess of said alkali hydroxide is added at the ratio of about 1 to 3 weight units for each weight unit of 2,4,5-trichlorophenol present, cooling to crystallize said alkali salt and thereafter separating the said crystalized alkali salt of 2,4,5-trichlorophenol from solution by filtration, and recovering 2,4,5-trichlorophenol from the said alkali salt thereof by treating said alkali salt with an acid selected from the group consisting of hydrochloric and sulfuric acid.

References Cited

UNITED STATES PATENTS

| | | | |
|---|---|---|---|
| 2,748,174 | 5/1956 | Jenney et al. | 260—623 |
| 2,755,307 | 7/1956 | Nicolaisen | 260—623 |
| 2,799,713 | 7/1957 | Widiger et al. | 260—623 |
| 3,347,937 | 10/1967 | Carr et al. | 260—623 |

BERNARD HELFIN, Primary Examiner

W. B. LONE, Assistant Examiner